United States Patent [19]
Ichiba et al.

[11] 3,849,591
[45]*Nov. 19, 1974

[54] LAMINATE TAPE INCLUDING AN ADHESIVE RESIN TERNARY COPOLYMER OF ETHYLENE, VINYL ACETATE AND GLYCIDYL METHACRYLATE OR GLYCIDYL ACRYLATE AND LAMINATE SHEATH CABLE MADE THEREFROM

[75] Inventors: Terumichi Ichiba; Hiroshi Shimba; Hiroaki Mukunashi, all of Kanagawa, Japan

[73] Assignee: Sumitomo Electric Industries Ltd., Osaka, Japan

[ * ] Notice: The portion of the term of this patent subsequent to July 30, 1991, has been disclaimed.

[22] Filed: Mar. 1, 1973

[21] Appl. No.: 337,048

[30] Foreign Application Priority Data
Mar. 3, 1972   Japan.............................. 47-22630
Mar. 3, 1972   Japan.............................. 47-22631
May 13, 1972   Japan.............................. 47-47334
May 13, 1972   Japan.............................. 47-47336

[52] U.S. Cl......... 174/107, 174/110 R, 174/110 PM
[51] Int. Cl............................................... H01b 7/18
[58] Field of Search.. 161/218, 216; 174/36, 102 R, 174/107, 110 PM, 110 R, 117 A

[56] References Cited
UNITED STATES PATENTS
3,383,372   5/1968   Spivey............................ 161/218 X
3,681,515   8/1972   Mildner............................ 174/107

OTHER PUBLICATIONS
Insulation/Circuits, Directory/Encyclopedia, June/July 1971, p. 122, 124.

*Primary Examiner*—A. T. Grimley
*Attorney, Agent, or Firm*—Sughrue, Rothwell, Mion, Zinn & Macpeak

[57] ABSTRACT

A laminate tape comprising a metal tape and a ternary copolymer composed of ethylene, vinyl acetate and glycidyl methacrylate or glycidyl acrylate laminated on one or both surfaces of the metal tape, and a laminate sheathed cable comprising a cable core and the above laminated tape are disclosed.

10 Claims, 4 Drawing Figures

FIG.2a  RESIN SHEET (1mm) / ALUMINUM SHEET (0.2mm)

FIG.2b  RESIN SHEET (0.05mm) / ALUMINUM SHEET (0.2)

FIG.2c  POLYETHYLENE SHEET (1.0mm) / RESIN SHEET (1.0mm)

LAMINATE TAPE INCLUDING AN ADHESIVE RESIN TERNARY COPOLYMER OF ETHYLENE, VINYL ACETATE AND GLYCIDYL METHACRYLATE OR GLYCIDYL ACRYLATE AND LAMINATE SHEATH CABLE MADE THEREFROM

BACKGROUND OF THE INVENTION

1. Field of the Invention

This invention relates to a laminate tape comprising a metal tape and a resin laminated on one or both surfaces of the metal tape, and to a laminate sheathed cable comprising a cable core, the laminate tape placed along the periphery of the cable core longitudinally or wound therearound transversely, and a plastic jacket coated on said laminate tape.

2. Description of the Prior Art

A resin to be laminated on the laminate tape for use in producing the laminate sheathed cable is required to have adhesive properties whereby it adheres to the metal tape and to the jacketing resin such as polyethylene. It is also required to have processability at the time of producing cables, for example, abrasion resistance, in a tape forming apparatus.

This requirement for adhesive properties is ascribed to the fact that the laminate sheathed cable should have moisture proofing properties (the prevention of moisture from outside) and provide a bonded unitized sheath (protective layer) to improve its mechanical strength (e.g., bending property) whereby the shrinkage of the sheath is restrained by aluminum (the plastic sheath contains distortion at the time of extrusion, and shrinks by the heat cycle of the outer atmosphere).

As is seen in British Patent Specification No. 886,417, polyethylene has long been used as the laminating resin, but it has suffered from the defect of weak adhesive strength with an aluminum tape.

U.S. Pat. No. 3,233,036 discloses the technique which remedied this defect by using a carboxyl-containing resin so as to improve its adhesion with the aluminum tape. It, however, has the defect that sufficient bond strength cannot be obtained because such a resin extremely differs in polarity from polyethylene used in the protective layer.

U.S. Pat. No. 3,586,756 (corresponding to Japanese Patent Publication No. 23257/70) discloses an invention which has eliminated the above-mentioned two defects. According to this invention, there is provided a multi-layered laminate tape in which an ethylene copolymer containing a carboxyl group capable of chemically bonding with metal is laminated on the surface to be in contact with a metal tape (for example, an aluminum tape), and on the surface not to be in contact with the metal tape is laminated a resin which does not adhere to the metal tape so effectively as the above copolymer but adheres to the jacketing layer more strongly than the above copolymer.

U.S. Pat. No. 3,586,756 (corresponding to Japanese Pat. No. 23257/70) discloses a method whereby the properties of the two-layered laminate tape are imparted to a monolayer laminate tape. According to this method, reactive groups are concentrated in the vicinity of the metal tape in a resin layer laminated on the metal tape, and the concentration of the reactive groups is progressively decreased away from the metal surface until the surface of the laminate layer adheres to the jacketing polyethylene but not to the metal. This laminate tape is produced, for example, by a method which comprises first preparing a polyethylene tape, chemically treating only one surface of the polyethylene tape to form a layer containing reactive groups on said surface, bonding the chemically treated surface to the surface of a metal tape, and then heat sealing them to each other. This suffers from manufacturing difficulties, and is not economical.

SUMMARY OF THE INVENTION

We have now found that a monolayered laminate tape can be produced with simplicity using a laminate resin composed of a terpolymer of ethylene, vinyl acetate and glycidyl methacrylate or glycidyl acrylate which adheres sufficiently to the jacketing polyethylene as well as the metal layer, and that laminate sheathed cables of superior mechanical properties can be produced with economical advantage using this laminate tape.

In one aspect of this invention, there is provided a laminate tape comprising a metal tape and a terpolymer composed of ethylene, vinyl acetate and glycidyl methacrylate or glycidyl acrylate laminated on one or both surfaces of the metal tape.

In another aspect of this invention, there is provided a laminate tape comprising a metal tape and a mixture of (1) a terpolymer of ethylene, vinyl acetate and glycidyl methacrylate or glycidyl acrylate and (2) a binary copolymer of ethylene and an alkyl methacrylate such as methyl methacrylate or an alkyl acrylate such as ethyl acrylate, said mixture being laminated on one or both surfaces of the metal tape.

In still another aspect of this invention, there is provided such a laminate tape as described above which further contains in the laminating resin 100 to 10,000 ppm of an antioxidant to improve thermal stability.

The invention also provides a laminate sheathed cable using any one of the above described laminate tapes.

BRIEF DESCRIPTION OF THE ACCOMPANYING DRAWINGS

FIG. 1 is a transverse sectional view of a known laminate sheathed cable using a laminate tape on one surface of which is laminated a resin; and FIG. 2 is a view for illustrating a method of testing the adhesive strength of a laminate tape.

DETAILED DESCRIPTION OF THE INVENTION

The present invention will be described with reference to the accompanying drawings.

Figure 1:
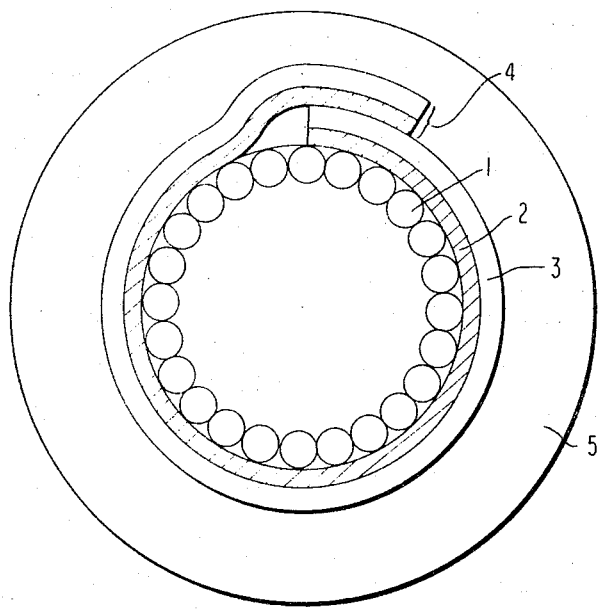
Figure 1:
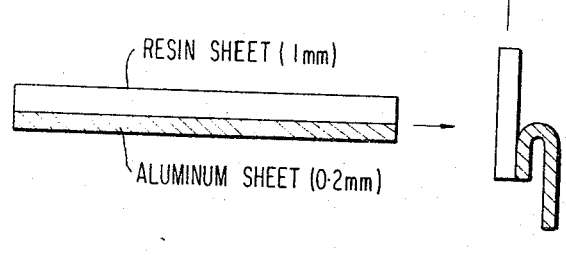
Figure 1:
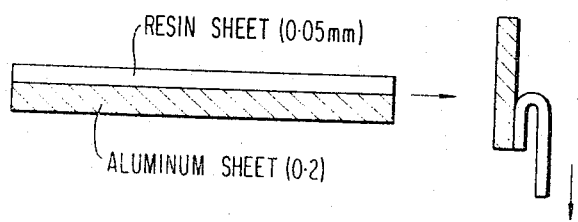
Figure 1:
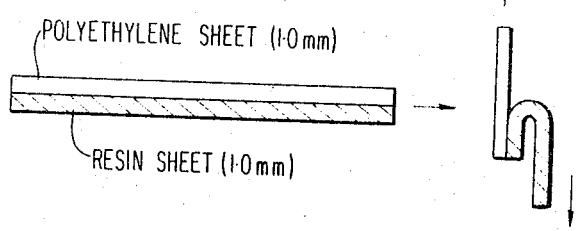

Laminate sheathed cables of the construction shown in FIG. 1 were produced using the above-mentioned three types of laminate tapes. In FIG. 1, the reference numeral 1 represents a cable core, 4 a metal tape, 2 a resin layer, 3 a laminate tape layer, and 5 a jacketing layer of a synthetic resin. The properties of these three laminate sheathed cables are compared with one another in Table 1 below. The laminate tape used in producing the laminate sheathed cables tested above consists of a soft aluminum tape having a thickness of 0.2 mm and a laminate resin layer having a thickness of 0.05 mm.

Table 1

| Resin No. * | Adhesive strength between the aluminum tape and the polyethylene jacket ** | | Number of bending until the cracking of the aluminum tape *** | Remarks |
|---|---|---|---|---|
| P | 0.95 Kg/cm | (a) | 10 – 15 times | (a) Peel off occurred between the aluminum and the laminate resin |
| S | 1.55 | (b) | 20 – 25 | (b) Peel off occurred between the polyethylene jacket and the laminate resin |
| E-S | 3.05 | (c) | 30 – 35 | (c) Cohesive destruction between the aluminum and the polyethylene jacket occurred |

\* P: Laminating polyethylene (Sumikathene F-701)
S: Metal salt of a copolymer of ethylene and acrylic acid (Surlyn A)
E-S: A two-layered laminate in which S is laminated on the aluminum surface and on top of it, a copolymer of ethylene and vinyl acetate is laminated (Evatate D-2011)
\*\* A rectangular sample with a width of 10 mm is taken from the cable sheath, and a peeling test is conducted by pulling at a separating speed of 100 mm/min. in a direction of 180°.
\*\*\* Bending test: The sample is bended reciprocally at 180° over a mandrel having a diameter 12 times as large as that of the cable. One reciprocal bending is counted as one time.

As is seen from Table 1, the laminate sheathed cable using the two-layered laminate cable exhibits very superior properties. On the other hand, however, because of the multilayered structure, the production of this kind of laminate tape involves complicated manufacturing steps and a high cost of production, which in turn results in an increase in the cost of the cable.

The properties of the laminate sheathed cable have been improved by using the mixture of the copolymers (1) and (2) described above. This is because the adhesion between the laminate resin layer and the metal is increased not only by the reaction of the metal with the epoxy groups contained in the component (1) but also by ensuring good contact between them owing to the component (2), and also the adhesion between the jacketing polyethylene and the laminate resin layer is increased by the component (2) which has good compatibility with polyethylene. We attempted to use a copolymer of ethylene and vinyl acetate as the component (2), but since such was already contained in component (1), no effect was observed. The copolymer as component (1) can be obtained by various methods. For example, it is obtained by polymerizing a mixture of ethylene with another monomer at 40° – 300°C and 40 – 5,000 Kg/cm² in the presence of a free radical initiating catalyst. During polymerization, a chain transfer agent such as ethane, propane or propylene may be added.

The reason for the addition of the antioxidant to the resin is that it is desired to render the high speed processing of the resin easy by elevating the extrusion temperature of the resin to more than about 265°C, which in turn brings about an increase in adhesive strength between the metal and the resin layer and renders the thickness of the resin layer uniform.

The following Examples will further illustrate the present invention.

EXAMPLE 1

Samples were prepared by sheet formation and lamination, and the adhesive strength between aluminum and the novel terpolymer described above (containing no antioxidant), the mixture of the components (1) and (2) described above or the conventional resin, and the adhesive strength between the above resin and polyethylene used as a jacketing plastics. The results are shown in Table 2. Table 3 shows the composition of each resin and its melt index.

TABLE 2

Adhesive and other properties of the resin (without an antioxidant)

| Abbreviation of the resin * | Adhesive strength between the aluminum tape and the laminating resin | | Adhesive strength between the laminating resin and polyethylene sheet method * (3) | Process stability of cable * (4) | Blocking of the laminate tape * (5) | Adhesive strength between the aluminum tape and the laminating resin * (6) |
|---|---|---|---|---|---|---|
| | sheet method * (1) | laminating method * (2) | | | | |
| E₁ | 394 g/cm | 320 g/cm | more than 4 kg/cm | poor | yes | — |
| E₂ | 341 | 341 | do. | good | no | — |
| B₁ | 1613 | 433 | do. | poor | yes | — |
| B₂ | 1068 | 421 | do. | do. | do. | — |

TABLE 2-Continued

Adhesive and other properties of the resin
(without an antioxidant)

| Abbreviation of the resin | | Adhesive strength between the aluminum tape and the laminating resin | | | | Adhesive strength between the laminating resin and polyethylene sheet method *(3) | Process stability of cable *(4) | Blocking of the laminate tape *(5) | Adhesive strength between the aluminum tape and the laminating resin *(6) | |
|---|---|---|---|---|---|---|---|---|---|---|
| | | sheet method *(1) | | laminating method *(2) | | | | | | |
| $B_3$ | | 769 | | 390 | | do. | good | no | — | |
| S | | 1559 | | 1055 | | 0 | do. | do. | — | |
| P | | 159 | | 50 | | 5.5 | do. | do. | — | |
| $G_1$ | | 2440 | | more than 900 | | more than 4 | do. | do. | 430 | g/cm |
| $G_2$ | | 2820 | | do. | | do. | do. | do. | 398 | |
| $G_3$ | | 3150 | g/cm | more than 900 | g/cm | more than 4 | kg/cm | good | no | 450 | g/cm |
| $G_4$ | | 3620 | | do. | | do. | do. | do. | 409 | |
| $G_5$ | | 2430 | | do. | | do. | do. | do. | 443 | |
| $G_6$ | | 3880 | | do. | | do. | do. | do. | 445 | |
| $H_1$ | | 2940 | | do. | | do. | do. | do. | 404 | |
| $G_1/B_1=$ | 90/10 | 3440 | | do. | | do. | do. | do. | 440 | |
| | 70/30 | 3310 | | do. | | do. | do. | do. | 451 | |
| | 50/50 | 3215 | | do. | | do. | do. | do. | 437 | |
| | 30/70 | 2860 | | do. | | do. | do. | do. | 442 | |
| $G_1/B_2=$ | 50/50 | 2510 | | do. | | do. | do. | do. | 430 | |
| $G_1/B_3=$ | 80/20 | 2940 | | do. | | do. | do. | do. | 438 | |
| $G_2/B_1=$ | 95/5 | 3380 | | do. | | do. | do. | do. | 431 | |
| | 60/40 | 3230 | | do. | | do. | do. | do. | 418 | |
| | 30/70 | 2940 | | do. | | do. | do. | do. | 405 | |
| | 10/90 | 2830 | | do. | | do. | do. | do. | 425 | |
| $G_2/B_2=$ | 80/20 | 3450 | | more than 700 | | more than 4 | | do. | do. | 400 | |
| | 20/80 | 2850 | | do. | | do. | do. | do. | 419 | |
| $G_3/B_1=$ | 50/50 | 2900 | | do. | | do. | do. | do. | 448 | |
| $G_3/B_2=$ | 80/20 | 3920 | | do. | | do. | do. | do. | 452 | |
| $G_3/B_2=$ | 70/30 | 3240 | g/cm | more than 700 | g/cm | more than 4 | kg/cm | good | no | 455 | g/cm |
| $G_4/B_3=$ | 90/10 | more than 4000 | | do. | | do. | do. | do. | 460 | |
| $G_5/B_1=$ | 95/5 | 3860 | | do. | | do. | do. | do. | 449 | |
| | 60/40 | 2710 | | do. | | do. | do. | do. | 432 | |
| | 10/90 | 2460 | | do. | | do. | do. | do. | 418 | |
| $G_5/B_2=$ | 70/30 | 3355 | | do. | | do. | do. | do. | 450 | |
| | 50/50 | 2840 | | do. | | do. | do. | do. | 427 | |
| $G_5/B_3=$ | 60/40 | 2800 | | do. | | do. | do. | do. | 431 | |
| $G_6/B_1=$ | 95/5 | more than 4000 | | do. | | do. | do. | do. | 458 | |
| $G_6/B_2=$ | 70/30 | do. | | do. | | do. | do. | do. | 452 | |
| | 10/90 | 3890 | | do. | | do. | do. | do. | 494 | |
| | 5/95 | 3870 | | do. | | do. | do. | do. | 429 | |
| $G_6/B_3=$ | 50/50 | more than 4000 | | do. | | do. | do. | do. | 419 | |
| $H_1/B_1=$ | 90/10 | 3660 | | do. | | do. | do. | do. | 415 | |
| | 50/50 | 3640 | | do. | | do. | do. | do. | 421 | |
| $H_1/B_2=$ | 90/10 | 3480 | | do. | | do. | do. | do. | 426 | |
| | 70/30 | 2220 | | do. | | do. | do. | do. | 399 | |
| | 50/50 | 3340 | | do. | | do. | do. | do. | 407 | |
| $H_1/B_2=$ | 30/70 | 3210 | g/cm | more than 700 | g/cm | more than 4 | kg/cm | good | no | 428 | g/cm |
| | 10/90 | 2950 | | do. | | do. | do. | do. | 428 | |
| $H_1/B_3=$ | 60/40 | 3400 | | do. | | do. | do. | do. | 413 | |
| | 20/80 | 3010 | | do. | | do. | do. | do. | 416 | |
| two-layered tape*(7) | | — | | 520 | | — | do. | do. | — | |

(Note: Symbol — shows that the property was not measured.)
*(1) Method wherein soft aluminum (thickness 0.2 mm) is heat bonded at 180°C with a resin sheet (thickness 1.0 mm), followed by cooling to room temperature. (For the measurement of the adhesive strength, see FIG. 2, (a).)
*(2) Method wherein a layer of resin (0.05 mm) is laminated on soft aluminum (thickness 0.2 mm) using an extruder. (For the measurement of the adhesive strength, see FIG. 2, (b).) The extrusion temperature is 230°C, and the speed of lamination is 10 meters/min.
*(3) Method wherein jacketing polyethylene (low density polyethylene thickness 1.0 mm) is heat bonded at 160°C with a resin sheet (thickness 1.00 mm), followed by cooling to room temperature. (For the measurement of the adhesive strength, see FIG. 2, (c).)
*(4) In the manufacture of cables, the surface of a resin film undergoes wear or splitting in a laminate tape forming apparatus, for example. This wear or splitting depends upon the mechanical properties of the resin, and also on the types of the comonomers and their contents.
*(5) The laminate tape wound in a coil form undergoes blocking during storage. The blocking depends upon the types of the comonomers, their contents and the melt index of the copolymer.
*(6) Method wherein a resin layer (thickness 0.05 mm) is laminated on soft aluminum (thickness 0.2 mm) using an extruder. (For the measurement of the adhesive strength, see FIG. 2, (c).) The extrusion temperatue is more than 265°C, and the speed of lamination is 10 meters/min.
*(7) The same tape as E-S in Table 1.

The composition and melt index of each resin are as shown in Table 3.

Table 3

| Laminate component | Abbreviation of resin | Melt index * (8) g/10 (min) | Composition (wt.%) | | | |
|---|---|---|---|---|---|---|
| | | | GMA | GA | VA | Ethylene |
| Used alone | P | 7.2 | 0 | 0 | 0 | 100 |
| | E₁ | 12.4 | 0 | 0 | 14 | Remainder |
| | E₂ | 2.8 | 0 | 0 | 5 | do. |
| | S | 3.5 | Composition unknown | | | |
| Use either alone or as the first component of the mixture | G₁ | 2.0 | 0.6 | 0 | 8 | Remainder |
| | G₂ | 2.0 | 2.4 | 0 | 8 | do. |
| | G₃ | 2.0 | 6.0 | 0 | 6 | do. |
| | G₄ | 6.0 | 12.0 | 0 | 6 | do. |
| | G₅ | 2.0 | 2.4 | 0 | 4 | do. |
| | G₆ | 12.0 | 15.0 | 0 | 2 | do. |
| | H₁ | 3.5 | 0 | 3.2 | 8 | do. |
| Use either alone or as the second component of the mixture | B₁ | 6 | | | | |
| | B₂ | 2 | | | | |
| | B₃ | 1 | | | | |

* (8) According to ASTM D-1236, temperature 190°C, load 2160 g.
P: polyethylene
E₁, E₂ (copolymer of ethylene and vinyl acetate)
S: copolymer of ethylene and a metal salt of acrylic acid
GMA: glycidyl methacrylate
GA: glycidyl acrylate
VA: vinyl acetate
B₁: ethylene/acrylate copolymer (DPDB-6169, acrylate concentration 20% by weight)
B₂: ethylene/acrylate copolymer (DPBA-6181, acrylate concentration 20 – 30% by weight)
B₃: ethylene/acrylate copolymer (DPBA-6182, acrylate concentration 14% by weight)

It is seen from the results shown in Table 2 that when the ternary copolymer composed of ethylene/vinyl acetate/glycidyl methacrylate or glycidyl acrylate is used as a laminating resin, the various properties are superior to those of the conventional laminate tapes. Furthermore, it is seen that the properties of the laminate tape using the mixture of the components (1) and (2) are better than those of the laminate tape using only either of components (1) or (2). Only some of the combinations of the components (1) and (2) are described in Table 2, but the same tendency was observed with regard to the other combinations.

With the samples obtained by the press sheet method (*1), and the laminate method (*2), the adhesion between the ternary copolymer of this invention and aluminum was superior, but the laminate tape obtained by using the laminate method (*6) at an extrusion temperature of more than 265°C was little different from the conventional laminate material and had inferior adhesive strength as compared with the case of extruding at 230°C. When the thickness of the laminated resin layer was examined, there was a variation in thickness of 10 percent at a maximum in the case of extrusion at 230°C, whereas in the case of extrusion at 265°C, the thickness fluctuated 34 percent in both ways.

EXAMPLE 2

To the above-described novel ternary copolymer and the mixture of the first and second components was added an antioxidant in an amount of 100 to 10,000 ppm. This made it possible to laminate the resin on metal at a higher temperature whereby the adhesion between the aluminum tape and the resin layer was further increased, the speed of lamination was increased and the thickness of the resin layer became uniform. The results are shown in Table 4. It is also seen from Table 4 that this effect cannot be seen in the conventional laminating materials.

The antioxidants tested are shown in Table 5, but Table 4 shows typical examples of them. The same effects were obtained with the other antioxidants. Furthermore, using the tape comprising a blend of the ternary copolymer or its mixture with the antioxidant, the producibility of cables and the blocking of the laminate tape were examined. The results were as good as in the case of using no antioxidant.

The effect of thermal stability was obtained with at least 100 ppm of the antioxidant, but its effect showed itself conspicuously in amounts of more than 300 ppm. The same effects were observed with the amounts up to 10,000 ppm.

However, when the amount of the antioxidant was greatly increased, the antioxidant tended to migrate onto the surface of the tape.

Accordingly, the preferred amount of the antioxidant is 300 to 5,000 ppm. By the addition of the antioxidant, lamination could be performed at a speed up to 86 meters per minute, and the fluctuation in thickness of the resin layer was within ± 8 percent.

Table 4

| Abbreviation of the resins | Antioxidant | Amount of the antioxidant | Adhesive strength between the aluminum tape and the laminate tape — Laminate method *(9) | |
|---|---|---|---|---|
| E₁ | Antigene WX | 1000 ppm | 355 | Kg/cm |
| E₂ | do. | do. | 334 | |
| B₁ | do. | do. | 460 | |
| B₂ | do. | do. | 430 | |
| B₃ | do. | do. | 408 | |
| S | do. | do. | 1026 | |
| P | do. | do. | 55 | |
| G₁ | do. | 100 | 510 | |
| do. | do. | 300 | 580 | |
| do. | do. | 1000 | more than 700 | |
| do. | do. | 5000 | do. | |
| do. | do. | 10000 | do. | |
| G₁ | Irganox 1010 | 100 | 498 | Kg/cm |
| do. | do. | 300 | 563 | |
| do. | do. | 1000 | more than 700 | |
| do. | do. | 5000 | do. | |
| do. | do. | 10000 | do. | |
| G₂ | Antigene WX | 100 | 515 | |
| do. | do. | 300 | 588 | |
| do. | do. | 1000 | more than 700 | |
| do. | do. | 5000 | do. | |
| do. | do. | 10000 | do. | |
| do. | Irganox 1010 | 100 | 495 | |
| do. | do. | 300 | 549 | |
| do. | do. | 1000 | more than 700 | |
| G₃ | Irganox 1010 | 5000 | do. | |
| do. | do. | 10000 | do. | |
| G₅ | Antigene WX | 100 | 537 | |
| do. | do. | 300 | 610 | |
| do. | do. | 1000 | more than 700 | |
| do. | do. | 5000 | do. | |
| do. | do. | 10000 | do. | |
| do. | Irganox 1010 | 100 | 502 | |
| do. | do. | 300 | 540 | |
| do. | do. | 1000 | more than 700 | |
| do. | do. | 5000 | do. | |
| do. | do. | 10000 | do. | |
| G₂/B₁=60/40 | Antigene WX | 100 | 491 | |
| do. | do. | 300 | 516 | |
| do. | do. | 1000 | 680 | |
| do. | do. | 5000 | more than 700 | |
| do. | do. | 10000 | do. | |
| do. | Irganox 1010 | 100 | 487 | |
| G₂/B₁=60/40 | Irganox 1010 | 300 | 532 | Kg/cm |
| do. | do. | 1000 | more than 700 | |
| do. | do. | 5000 | do. | |
| do. | do. | 10000 | do. | |
| G₅/B₃=60/40 | Antigene WX | 100 | 502 | |
| do. | do. | 300 | 594 | |
| do. | do. | 1000 | more than 700 | |
| do. | do. | 5000 | do. | |
| G₅/B₃=60/40 | Antigene WX | 1000 | do. | |
| do. | Irganox 1010 | 100 | 506 | |
| do. | do. | 300 | 631 | |
| do. | do. | 1000 | more than 700 | |
| do. | do. | 5000 | do. | |
| do. | do. | 10000 | do. | |
| H₁/B₁=50/50 | Antigene WX | 100 | 482 | |
| do. | do. | 300 | 499 | |
| do. | do. | 1000 | 545 | |
| do. | do. | 5000 | more than 700 | |
| do. | do. | 10000 | do. | |
| do. | Irganox 1010 | 100 | 471 | |
| do. | do. | 300 | 532 | |
| do. | do. | 10000 | 682 | |
| do. | do. | 5000 | more than 700 | |
| do. | do. | 10000 | do. | |

* (9) Extrusion temperature, 265°C; speed of lamination, 30 meters per minute

Table 5

| No. | Antioxidants Chemical nomenclature | Tradename |
|---|---|---|
| 1 | 4,4'-thiobis-(6-tert-butyl-3-methyl phenol) | Antigene WX |
| 2 | 4,4'-butylidene-bis-(6-tert-butyl-3-cresol) | Sumilizer BBM |
| 3 | High molecular weight phenol type compound | Topanol CA |
| 4 | Mercaptobenzimidazole | Antigene MB |
| 5 | Zinc salt of 2-mercaptobenzothiazole | Soxinol MZ |
| 6 | Selenium diethyl-dithiocarbamate | Soxinol SE |
| 7 | Polymer of 2,2,4-trimethyl-1,2-dihydroquinoline | Antigene RD |
| 8 | Reaction product of 1,1-bis(4-hydroxyphenyl) cyclohexane and an organic amine | Antigene WA |
| 9 | N,N-di-β-naphthyl-p-phenylene diamine | Antigene F |
| 10 | Phenyl-α-naphthylamine | Antigene PA |
| 11 | Phenyl-β-naphthylamine | Antigene D |
| 12 | Triazine derivative | Irganox 565 |
| 13 | Triazine derivative | Irganox 858 |
| 14 | High molecular weight hindered phenol | Irganox 1010 |
| 15 | High molecular weight hindered phenol | Irganox 1076 |

A laminate tape was produced using each of the resins alone or a mixture of the first and second components, and a laminate sheathed cable was produced using each of the laminate tapes. The properties of the laminate sheathed cables obtained are shown in Tables 6, 7 and 8.

The laminate tape was produced using an extruder having a cylinder diameter of 50 mm at an extrusion temperature of about 230°C (for resins not containing the antioxidant) or at 265°C (for those containing the antioxidant) in accordance with the T-die method. Each of the laminate tapes consisted of a 0.2 mm thick soft aluminum tape and the resin layer having a thickness of 0.05 mm. The cable tested was of the structure shown in FIG. 1, and was an aerial cable with a conductor diameter of 0.4 mm (26 AWG, 100 pairs). The jacketing resin was polyethylene, and the processing temperature was 220° to 230°C.

Table 6

| Component | Abbreviation of the resins | (without antioxidant) Adhesive strength between the aluminum tape and the polyethylene jacket (Note-1) | Number of bending (Note-2) until the cracking of the aluminum tape |
|---|---|---|---|
| First component | $G_1$ | 3.01 | 30 – 35 |
| | $G_2$ | 3.30 | 35 – 40 |
| | $G_3$ | 3.44 | 35 – 40 |
| | $G_4$ | 3.62 | 35 – 40 |
| | $G_5$ | 3.25 | 35 – 40 |
| | $G_6$ | 3.40 | 35 – 40 |
| | $H_1$ | 3.12 | 30 – 35 |
| Second component | $B_1$ | 1.54 | 20 – 25 |
| | $B_2$ | 0.94 | 12 – 16 |
| | $B_3$ | 0.68 | 8 – 13 |

Note-1: Same as in Table 1
Note-2:

Table 7

| Component | Ratio of first/second components (wt.%) | | Adhesive strength between the aluminum tape and the polyethylene jacket (Kg/cm) (Note-1) | Bending property (number of bending until the cracking of the aluminum tape) (Note-2) |
|---|---|---|---|---|
| Mixture | $G_1/B_1$ | = 90/10 | 3.54 | 33 – 38 |
| | do. | = 70/30 | 3.52 | do. |
| | do. | = 30/70 | 3.49 | do. |
| | $G_1/B_2$ | = 50/50 | 3.40 | do. |
| of | $G_1/B_3$ | = 80/20 | 3.50 | do. |
| | $G_2/B_1$ | = 95/5 | 3.82 | more than 40 |
| | do. | = 60/40 | 3.80 | do. |
| the | do. | = 10/90 | 3.51 | do. |
| | $G_2/B_2$ | = 80/20 | 3.74 | do. |
| | do. | = 20/80 | 3.61 | do. |
| | $G_3/B_1$ | = 50/50 | 3.68 | do. |
| first | $G_3/B_2$ | = 80/20 | 3.94 | do. |
| | $G_4/B_3$ | = 90/10 | more than 4.00 | do. |
| | $G_5/B_1$ | = 95/5 | do. | do. |
| | do. | = 60/40 | 3.85 | do. |
| and | $G_5/B_2$ | = 70/30 | 3.85 | do. |
| | do. | = 50/50 | 3.71 | do. |
| | $G_5/B_3$ | = 60/40 | 3.72 | do. |
| | $G_6/B_2$ | = 70/30 | 3.92 | more than 40 |
| second | do. | = 5/95 | 3.45 | do. |
| | $G_6/B_3$ | = 50/50 | 3.67 | do. |
| | $H_1/B_1$ | = 90/10 | 3.44 | do. |
| | do. | = 50/50 | 3.42 | do. |
| components | $H_1/B_2$ | = 90/10 | 3.78 | do. |
| | do. | = 50/50 | 3.61 | do. |
| | do. | = 10/90 | 3.16 | do. |
| | $H_1/B_3$ | = 60/40 | 3.55 | do. |
| | do. | = 20/80 | 3.20 | do. |

Note-1: Same as in Table 1
Note-2:

Table 8

| Abbreviation of the resins | | Adhesive strength between the aluminum tape and the polyethylene jacket (Note-1) | Number of bending until the cracking of the aluminum tape (Note-2) |
|---|---|---|---|
| $G_1$ | (300 ppm) | 3.23 | 30 – 35 |
| $G_1$ | (1000 ppm) | 3.45 | 35 – 40 |
| $G_1$ | (5000 ppm) | 3.51 | 35 – 40 |
| $G_3$ | (300 ppm) | 3.32 | 35 – 40 |
| $G_3$ | (1000 ppm) | 3.50 | 35 – 40 |
| $G_3$ | (5000 ppm) | 3.65 | more than 40 |
| $H_1$ | (1000 ppm) | 3.37 | 35 – 40 |
| $G_2/B_1 =$ | 60/40 (1000 ppm) | 3.88 | more than 40 |
| $G_2/B_1 =$ | 60/40 (500 ppm) | 3.82 | do. |
| $G_5/B_1 =$ | 60/40 (1000 ppm) | 3.90 | do. |
| $G_5/B_1 =$ | 60/40 (5000 ppm) | 3.94 | do. |
| $H_1/B_1 =$ | 50/50 (1000 ppm) | 3.62 | do. |

Note-1: Same as in Table 1
Note-2:

It is seen from the results shown in Tables 6, 7 and 8 that the laminate sheathed cables of this invention produced by using the laminate tapes of this invention have outstandingly superior characteristics to the conventional cables. Table 8 shows the results of only some of the experiments performed, but extensive investigation showed that the characteristics of the laminate sheathed cable of this invention are best when the mixture of the first component and 5 to 95 percent by weight, preferably 5 to 70 percent by weight, of the second component is used to produce the laminate tape of this invention.

While the invention has been described in detail and with reference to specific embodiments thereof, it will be apparent to one skilled in the art that various changes and modifications can be made therein without departing from the spirit and scope thereof.

What is claimed is:

1. A laminate tape comprising a metal tape and a resin which is a ternary copolymer composed of ethylene, vinyl acetate and glycidyl methacrylate or glycidyl acrylate, said resin being laminated on one or both surfaces of said metal tape.

2. The laminate tape of claim 1 wherein said laminating resin contains 100 ppm to 10,000 ppm of an antioxidant.

3. The laminate tape of claim 2 wherein said antioxidant is 4,4'-thiobis-(6-tert butyl-3-methylphenol).

4. The laminate tape of claim 2 wherein said antioxidant a high molecular weight hindered phenol.

5. A laminate tape comprising a metal tape and a resin which consists of, as a first component, a ternary copolymer composed of ethylene, vinyl acetate and glycidyl methacrylate or glycidyl acrylate and, as a second component, a binary copolymer composed of ethylene and an alkyl methacrylate or alkyl acrylate, said resin being laminated on one or both surfaces of said metal tape.

6. The laminate tape of claim 5 wherein said laminating resin contains 100 ppm to 10,000 ppm of an antioxidant.

7. The laminate tape of claim 6 wherein said antioxidant is 4,4'-thiobis-(6-tert butyl-3-methylphenol).

8. The laminate tape of claim 6 wherein said antioxidant is a high molecular weight hindered phenol.

9. A laminate sheathed cable comprising a cable core and a laminate tape wrapping said core airtight, said laminate tape comprising a metal tape and a resin which is a terminary copolymer composed of ethylene, vinyl acetate and glycidyl methacrylate or glycidyl acrylate, said resin being laminated on one or both surfaces of said metal tape.

10. A laminate sheathed cable comprising a cable core and a laminate tape wrapping said core air-tight, said laminate tape comprising a metal tape and a resin which consists of, as a first component, a ternary copolymer composed of ethylene, vinyl acetate and glycidyl methacrylate or glycidyl acrylate and, as a second component, a binary copolymer composed of ethylene and an alkyl methacrylate or alkyl acrylate, said resin being laminated on one or both surfaces of said metal tape.

* * * * *